United States Patent [19]

Maurer

[11] 4,133,586
[45] Jan. 9, 1979

[54] AXIAL SLIDE BEARING
[75] Inventor: Friedel Maurer, Walluf, Germany
[73] Assignee: Glyco-Metall-Werke, Daelen & Loos GmbH, Wiesbaden-Schierstein, Germany
[21] Appl. No.: 822,249
[22] Filed: Aug. 5, 1977
[30] Foreign Application Priority Data
Dec. 11, 1976 [DE] Fed. Rep. of Germany ....... 2656306
[51] Int. Cl.² ............................................. F16C 43/02
[52] U.S. Cl. ..................................... 308/23; 308/167; 308/237 R
[58] Field of Search ................ 308/3 R, 5 R, 23, 23.5, 308/179, 179.5, 167, 237 R, 237 A, 172, 168

[56] References Cited
U.S. PATENT DOCUMENTS 3,929,395  12/1975  Stojek ................................. 308/23 X
4,017,127  4/1977  Smith et al. ............................. 308/23

Primary Examiner—Trygve M. Blix
Assistant Examiner—Douglas C. Butler
Attorney, Agent, or Firm—Strauch, Nolan, Neale, Nies & Kurz

[57] ABSTRACT

A shaft bearing wherein axially facing slide bearing elements carry projections that extend either laterally or generally radially into interferring engagement with the shaft when incorrectly positioned in the assembly.

6 Claims, 14 Drawing Figures

Fig. 6
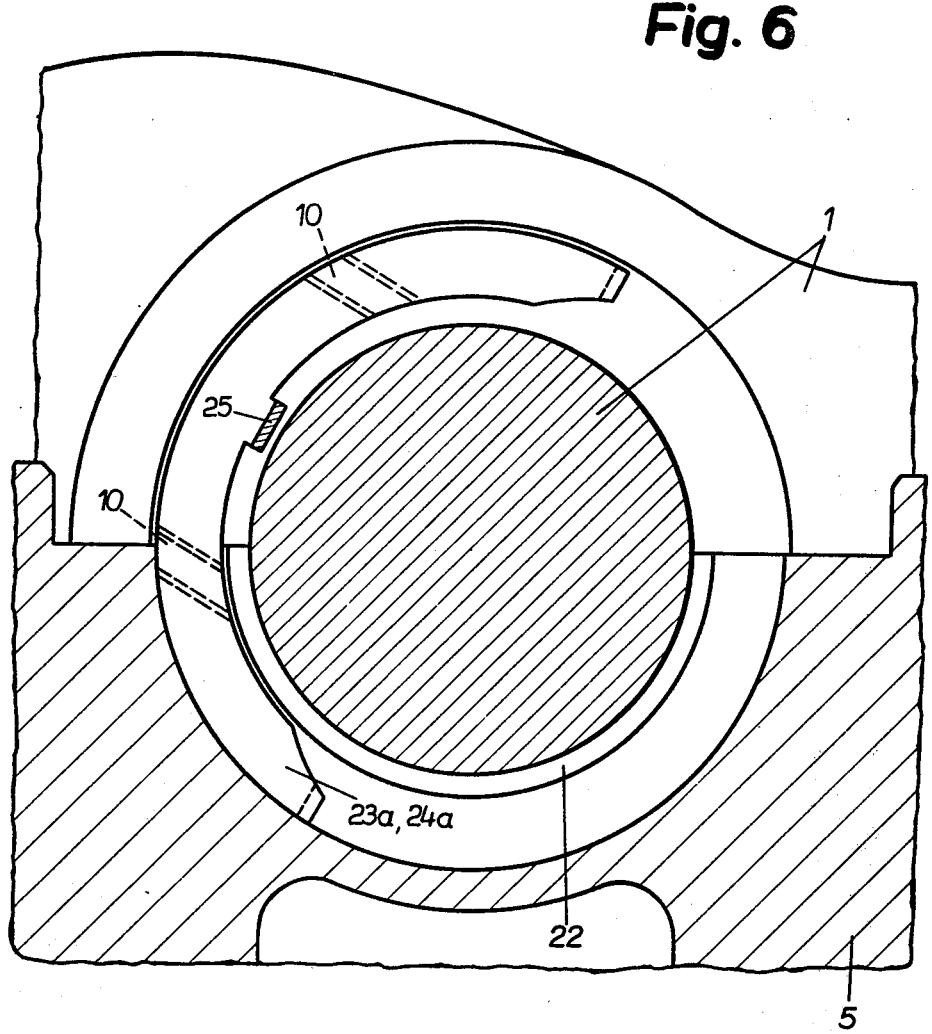
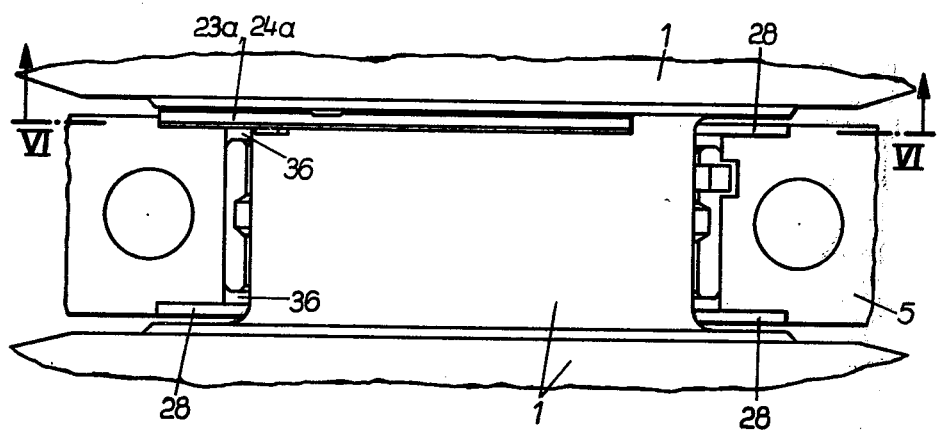
Fig. 5

AXIAL SLIDE BEARING

This invention concerns an axial slide bearing of solid or split design, the latter also called flanged thrust bearings, made of solid or laminated sliding bearing material.

Axial slide bearings are very often used in engine and machine construction in order to absorb axial forces of a shaft and thus to fix the axial position. Also, structural conditions may not permit the use of solid axial slide bearings, so that split axial slide bearings must be used. For reasons of appropriate lubrication, axial slide bearings are provided with lubrication fittings in the sliding bearing surface.

It can happen during installation that, due to carelessness, axial slide bearings are assembled in reverse position. These defects can be avoided by structural measures, such as asymmetrical configuration, only in some cases. A second known method for the prevention of these installation errors is the expensive application of combination axial-radial slide bearings, also called flanged bushings and flanges sleeves.

The first known possibility, namely the asymmetrical configuration of the assembly elements, is more economical than the second, but it can unfortunately not be generally used. In addition, in spite of structural measures in the configuration, errors occur in assembly, which are discovered only considerably later and result in a partial disassembly of the engine, with unforeseen costs.

FIGS. 1 and 2 show an example of the defective installation of an asymmetrical axial slide bearing. This example concerns a main bearing arrangement on a crankshaft 1. This bearing arrangement consists of a preferably split radial slide bearing 2 and two axial slide bearings 3 and 4 in a split configuration, of which one each of the flanged bearings 3a, respectively 4a is arranged in the area of housing 5, and the second flanged bearing 3b, respectively 4b in the area of cover 6.

The flanged thrust bearings are configured asymmetrically as follows: All bearings have separation edges 7, which are oblique, i.e., they do not extend radially, but they fit accurately together, and the flanged thrust bearings 3b and 4b, which are arranged in the area of cover 6, have a rotation prevention lug 8, which extends eccentrically, i.e., not radially, towards the outside, which engages a corresponding recess 9 of the cover 6. Due to this rotation prevention lug 8, the flanged thrust bearings 3b and 4b can be installed only in the correct position between cover 6 and crankshaft 1.

In contrast, it is quite possible to reversely insert the flanged thrust bearings 3a, respectively 4a, which are provided in the area of housing 5, in such a manner that the slide bearing rotating surface with the lubrication fittings 10 does not face crankshaft 1, but housing 5. As can be seen from FIG. 2, the separation edges 7 of a reversely inserted flanged thrust bearing do not fit together, however. Purely theoretically, this installation error should become visible immediately during assembly. However, because, in the illustrated example, cover 6 is inserted between a raised portion 11 of housing 5, a remaining opening 12, which could, for example, amount to several millimeters, is covered by raised portions 11, so that the installation error is not detected immediately, but only after the fact. The later detection of the installation error has the disadvantage that the engine has to be disassembled again and that the axial slide bearing 3 could have been damaged considerably, and possibly also the radial slide bearing 2.

A third possibility for avoiding the above-mentioned shortcomings consist of providing axial slide bearings with slide bearing running surfaces and lubricating fittings on both sides, so that the installation position can be optional. However, these configurations are used very little, because they involve considerably increased costs.

It is therefore the major object of this invention to provide an axial slide bearing of a special configuration, which assures that the axial slide bearing can only be installed in one single predetermined position. In this case, the laminated construction of the axial slide bearing should be optimally adapted to the bearing requirements. This object is particularly important for split axial slide bearings, in order to assure a non-reversed assembly. Inverted assembly occurs primarily in the case of split axial slide bearings, but it can also occur in the case of solid designs.

This invention is also concerned with a construction of the axial slide bearing with a carrier layer and a sliding bearing layer. With the construction with slide bearing rotating surfaces and lubricating fittings on both sides, the reverse installation would be basically avoided, but these axial slide bearings would be excessively expensive.

In accordance with this invention, it is proposed as a solution of this problem that at least one sidewise extending locking element is applied on the carrier and/or sliding layer to assure unmistakable, non-reversed installation.

The invention assures a consistently non-reversed assembly of the axial slide bearings.

The installation of a split axial slide bearing is generally carried out only after a radial slide bearing layer and a shaft are preassembled in the rigid housing. In this case, a profiled space is generated between the face of the radial slide bearing sleeve and the flange side of the shaft, which is now partly filled by the axial slide bearing. However, a conventional axial slide bearing does not completely fill this space, so that a free space remains on the face of the radial slide bearing sleeve. This invention now has the objective of utilizing this free space in order to assure a non-reversed installation.

Therefore, in the preferred embodiment of the invention, the locking element or elements is applied to the inner circumference on the carrier layer side of the axial slide bearing.

However, it is also possible to use a circumferential groove, which is applied to the outer circumferential area of the axial slide bearing in the housing, or to provide such a groove, and then to apply the locking element, respectively the locking elements on the outer circumference on the carrier layer side of the axial slide bearing. When the shaft, respectively the shaft flange, is configured with a groove, the locking element or elements can also be arranged on the sliding layer side within the scope of this invention. Finally, it is also not necessary to arrange the locking element or elements on the circumferential area of the axial slide bearing, but the application can also be provided on the carrier layer side within the carrier surface. The latter configuration presumes that a groove is premachined in the housing, or the cover. For the purposes of this invention, such an annular groove could be easily provided from the start in the production of the engine components.

The locking element, or elements, are in the preferred embodiment of this invention, projections, which extend inwardly from the axial slide bearing a distance equal to more than twice the clearance between the bearing and the adjacent housing surface. The axial slide bearing, which is thus configured, makes a reverse insertion absolutely impossible. It is possible that, with a shaft displacement, the axial slide bearing can be inserted wrong on one side. However, the second side can then not be equipped with certainty, because the remaining opening has been reduced more than the insertion dimension for one axial slide bearing.

Axial slide bearings with plane or developed lugs are known, but they have only one function as position or rotation assurance. A protruding surface such as a lug applied to the axial slide bearing in accordance with this invention has a locking function to assure a non-reversed installation and can, as shown in the following examples, be applied both to the inner radial portion of the slide bearing and also on the outer radial portion, provided that the structural conditions permit this construction. In the arrangement of the locking element on the outer portion of the axial slide bearing, not only the arrangement on the carrier layer, but also on the sliding layer side, must be realized.

As a significant further development and supplement of the invention, an axial slide bearing can also be provided, which can be particularly advantageously applied, with its locking element or elements, to those shafts in which the axial sliding surface, which cooperates with the axial slide bearing, has a curved transition into the cylindrical shaft surface.

For installation in a construction of this type, the locking element is configured in continuation, which extends essentially radially into the area of the transition radius and is chamfered, depressed, or rounded radially inwardly on its running surface side in accordance with this transition radius. In this manner, any contact between the locking element or elements and the arcuate surface formed by the transition radius is avoided with the correct insertion of the axial slide bearing. In the case of the reversed insertion of the axial slide bearing, the locking element reaches into this arcuate surface with its side which is not bevelled and abuts there, before it has been completely inserted. By a reversed position, it cannot be completely inserted. The locking element is thus completely effective for this application, without the necessity of a sidewise blocking and can therefore be produced considerably easier and cheaper. On the other hand, due to its inclined surface, it is protected against any contact with the arcuate surface between the axial sliding surface and the cylindrical surface of the shaft. In all forms of the invention the axial slide bearings are provided with projections, such as 25 (FIG. 3), 55 (FIG. 8), 35 (FIG. 10a) and 37a (FIG. 11a) for example which are formed asymmetrically with respect to the bearings.

BRIEF DESCRIPTION OF THE DRAWINGS

FIG. 5 is a plan view showing the rotary insertion of an axial slide bearing in accordance with this invention;

FIG. 6 is an end view mainly in section on line VI—VI of FIG. 5 showing the rotary insertion of an axial slide bearing;

PREFERRED EMBODIMENTS

Figure 1:
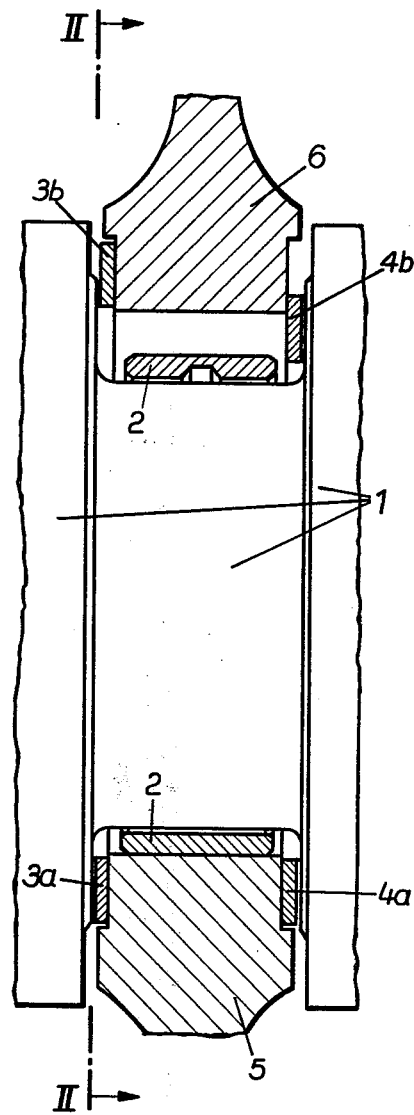
FIG. 1 is an axial section through a bearing assembly showing known prior construction.
Figure 3:
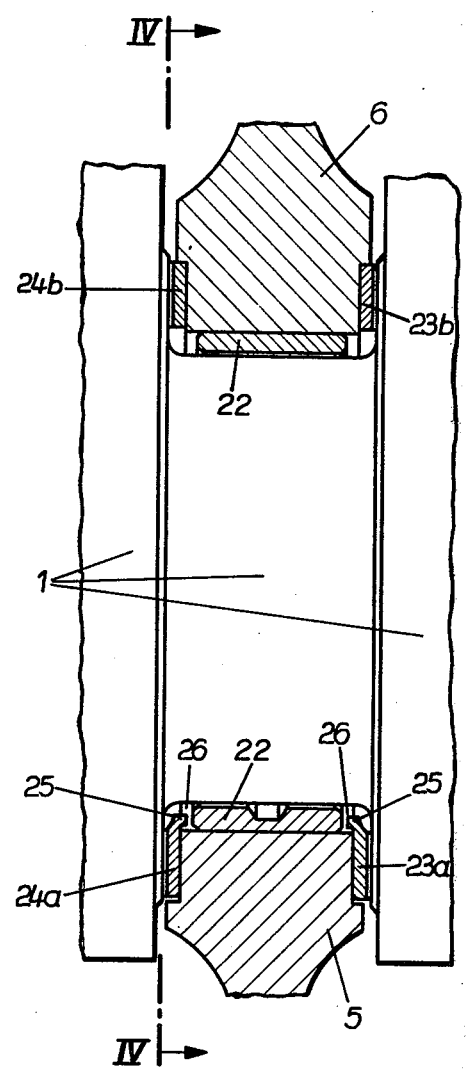
FIG. 3 shows an axial section of the bearing of a crankshaft with axial slide bearings according to an embodiment of this invention.
Figure 2:
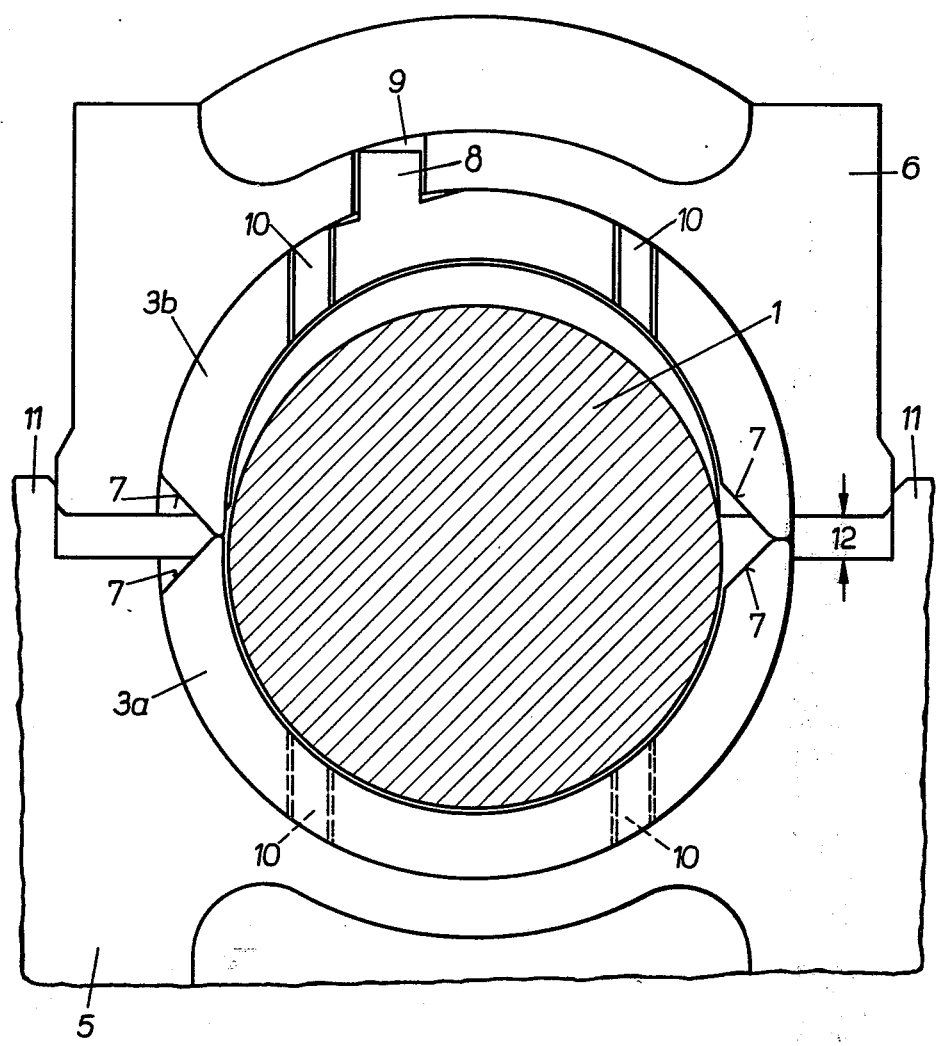
FIG. 2 is an end view in section substantially on line II—II of FIG. 1.
Figure 4:
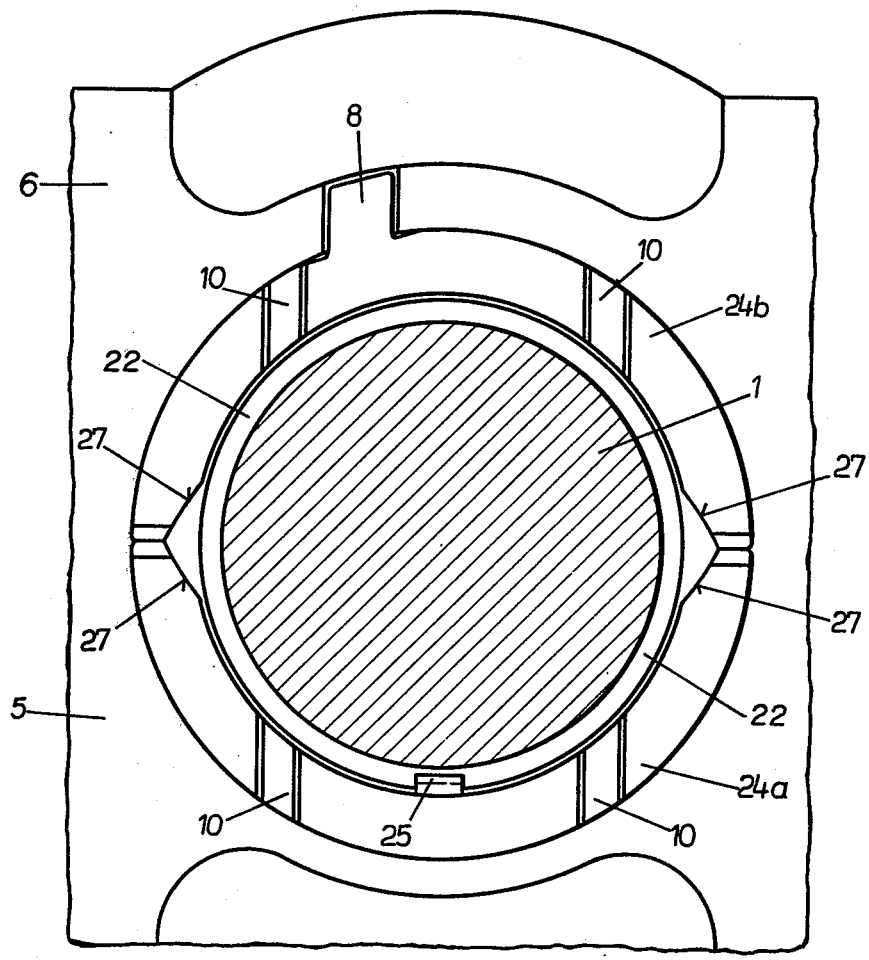
FIG. 4 is an end view in section substantially on line IV—IV of FIG. 3.

In the example of FIGS. 3 and 4, a main bearing arrangement on a crankshaft 1, with a bearing housing 5 and a bearing cover 6, is shown. The bearing arrangement contains a solid or split radial bearing 22 and two split axial slide bearings 23 and 24. In this example, the flanged thrust bearings 23b and 24b, inserted in the area of cover 6, have an eccentric, i.e., not radially arranged, rotational assurance strap 8, so that these flanged thrust bearings 23b and 24b are safeguarded against inverted insertion into cover 6. However, these flanged thrust bearings cannot be rotatably inserted.

Because it is desired in housing 5 to subsequently rotatably work in, i.e., after the insertion of the radial bearing sleeve and shaft 1, flanged thrust bearings 23a and 24a, a configuration such as on flanged thrust bearings 23b and 24b cannot be used. In accordance with this invention, the flanged thrust bearings 23a and 24a are preferably configured, in the middle area of their inner circumference, each with a projection 25 which extends towards the carrying or slide bearing surface side. As shown in FIG. 3, these projections engage in the free space 26 formed between the side edges of the radial bearing 22 and the side bearing surfaces of bearing housing 5. Projections 25 extend for a dimension greater than twice the axial bearing clearance with respect to the surface of the carrying side of the flanged thrust bearings 23a and 24a. If one or the other flanged thrust bearing would first be inserted wrong (which would be possible by a sidewise relative displacement of housing 5 and shaft 1), then the clear space which is to be filled between housing 5 and the shoulder of shaft 1 on the other side would become so axially small that a second flanged thrust bearing 23a, respectively 24a, could not be inserted there. The installation error is thus recognized immediately and the erroneously inserted flanged thrust bearing could be removed and inserted properly, before any damage in the bearing arrangement, the shaft or the housing could develop.

As can be seen at 27 in FIG. 4, it is still possible, in spite of the configuration of projection 25 on the inner circumference, to produce the flanged thrust bearings 23a and 24a with a recessed cut, i.e., a cut in which a triangular area is cut away on the separation edge area of the two semicircular flanged thrust bearings because the outer circumference of another flanged thrust bearing, preferably cut from the same material strip, is in this position.

As can be seen in FIGS. 3 and 4, projection 25 can initially be a lug extending radially inward in the middle area of the inner circumference of the flanged thrust bearing, which as can be seen from FIG. 3 has been depressed towards the carrying layer side of the flanged thrust bearing in order to form the sidewise projection of adequate thickness. However, it is also possible to form projection 25 by angling off of the lug projecting radially on the circumferential edge towards the carrying side.

FIGS. 5 and 6 show how a flanged thrust bearing 23a, respectively 24a, is to be worked into the housing of a main bearing arrangement. For this purpose, the flanged thrust bearing 23a, respectively 24a, is laid above housing 5 and the shaft 1, with the radial bearing half 22 already inserted, and bears against the flange of the shaft with its sliding layer side which contains the lubricating fittings 10. By rotating it slidably in its plane around the axis of shaft 1, the flanged thrust bearing 23a, respectively 24a, is inserted between the flange of shaft 1 and a circular mounting space 28 of housing 5. The projection extending on the carrying side of the flanged thrust bearing then enters the free space 26 on the circumferential edge of the radial slide bearing half 22. A smooth endwise insertion is only possible after the flanged thrust bearing 23a, respectively 24a, has previously been correctly laid against the flange of shaft 1. If the carrying side and projection 25 of flanged thrust bearing 23a, respectively 24a, had been placed against the flange of shaft 1, this smooth insertion of the flanged thrust bearing would not be possible. Even if the space between the flange of shaft 1 and recess 28 of housing 5 is greater on one side because shaft 1 and housing 5 are axially displaced with respect to each other, it would be possible to insert only one of the flanged thrust bearings 23a, respectively 24a, in the wrong position. On the then free side, the space between the flange of shaft 1 and recess 28 of housing 5 would become so close that it would not be possible to insert the second flanged thrust bearing either non-reversed or reversed.

The arrangement of projection 25 in the middle portion of the inner circumference of the flanged thrust bearing is not absolutely necessary. Rather, the arrangement of the projection, or even several projections at various points of the inner circumference is possible.

Figure 7:
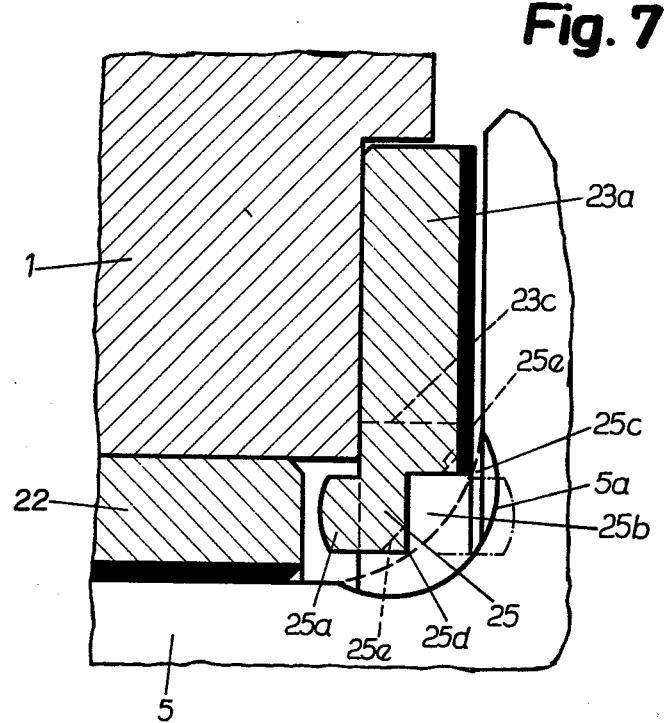
FIG. 7 is an enlarged fragmentary view mainly sectioned showing an axial slide bearing in accordance with FIG. 3 in comparison with a use with tangential shaft configuration.

As shown in FIG. 7, a radially inward extending locking projection 25 may be formed on the inner circumferential edge 23c in the case of an axial slide bearing, for example a flanged axial thrust bearing half 23a, which is formed, on its free end, with a projection 25a which extends from the back of flanged thrust bearing 23a. This projection 25a projects into the annular free space which exists at the side edge of the radial bearing 22.

For the purpose of forming this projection 25a, a depressed region 25b is formed, which may however not reach the inner circumferential edge 23c of flanged thrust bearing 23a, so that projection 25a will not contact shaft 1. On both sides of depression 25b, projecting edges 25c and 25d are formed. As shown in FIG. 7, these projecting edges have no function when housing 5 is configured with a clearance cut 5a. When, however, as illustrated in FIG. 7 by dotted lines, the housing has a transition from the circumferential surface to its axial sliding surface without clearance cut, edges 25c and 25d, which are projecting and are formed on both sides of the depression 25b, reach the area of the transition are which is without clearance cut. In order to avoid this danger, the projecting edges 25c and 25d, which are formed on both sides of the depression 25b would have to be bevelled, for example along dotted line 25e of FIG. 7. In this case, an axial slide bearing could then also be used on housings with a transition without clearance cut between the cylindrical housing surface and the axial sliding surface. However, this would necessitate an additional operating step and thus make the axial slide bearing more costly.

Figure 8:
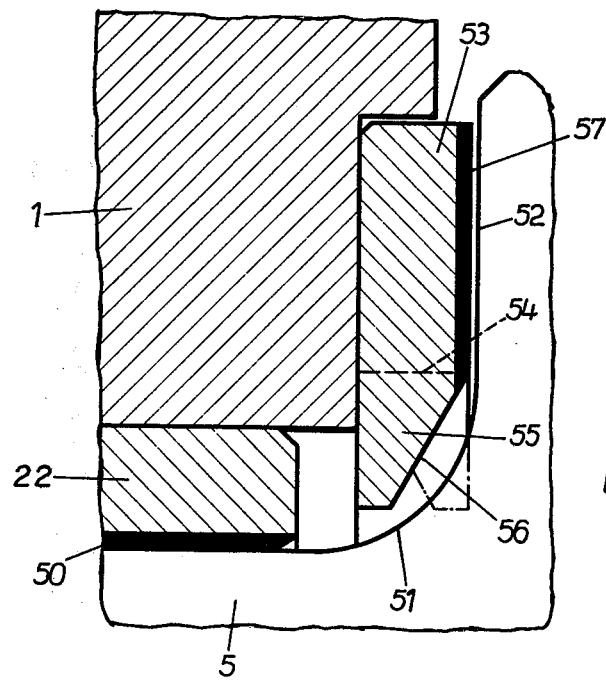
FIG. 8 is an enlarged fragmentary view similar to FIG. 7 showing a further developed axial slide bearing in accordance with this invention, with the use on a tangential shaft configuration.

In contrast, FIG. 8 shows the use of an axial slide bearing, for example a flanged thrust bearing half 53, in accordance with this invention, with a housing 5 in which the cylindrical shaft surface 50 makes a transition into the axial sliding surface 52 over an arc 51 without clearance cut. The flanged thrust bearing 53 also evidences a locking projection 55 which extends radially inward from the inner circumferential edge 54 of flanged thrust bearing 53. However, the locking projection 55 is only configured with a chamfer or rounding 56 on the side facing the axial sliding surface 52 of housing 5. This chamfer or rounding 56 has the effect that the locking projection 55, in the correctly inserted condition of flanged thrust bearing 53, safely remains at a distance from the arc 51, which is without clearance cut, of housing 5. Although locking projection 55 of flanged thrust bearing 53 does not evidence a projection which is axially inwardly directed towards the radial slide bearing 22 and engages under the bearing housing, a reverse insertion of flanged thrust bearing 53 is impossible because, as indicated by the dot-dash line in FIG. 8, locking projection 55 then interferes with arc 51, which is without clearance cut, of housing 5, with the result that the flanged thrust bearing sits obliquely on shaft 5 and makes the insertion of the bearing housing impossible. However, as shown by a comparison with FIG. 7, the configuration of locking projection 55, which is simplified and thus made much more economical in accordance with this invention, is intended only for use with shafts having a transition 51 between the cylindrical shaft surface 50 and the axial sliding surface 52 which is without clearance cut.

Figure 9:
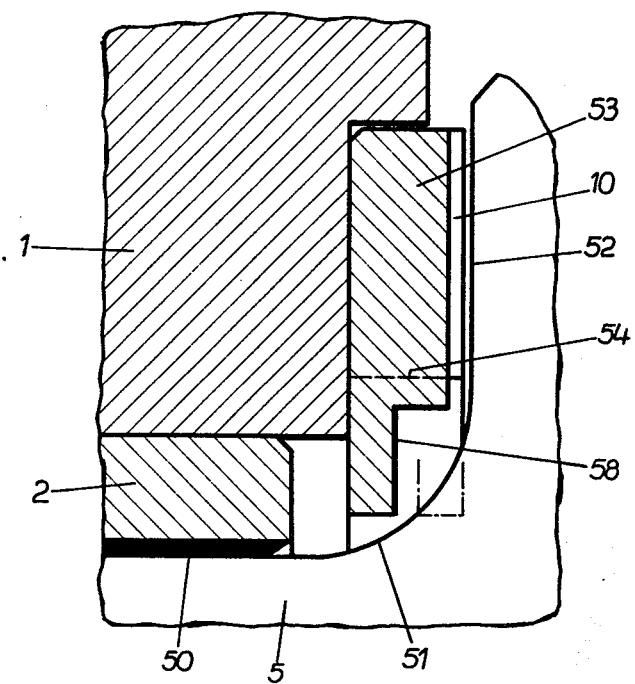
FIG. 9 is an enlarged fragmentary view similar to FIG. 7 of a further developed axial slide bearing in accordance with this invention, with the use on a tangential shaft configuration with depressed locking element.

FIG. 9 shows a similar configuration of the flanged thrust bearing 53 in accordance with this invention, for a housing 5, wherein the cylindrical shaft surface 50 makes a transition into the axial sliding surface 52 with an arc 51 without clearance cut. The flanged thrust bearing half 53 also evidences a locking projection 55, which extends radially inward from the inner circumferential edge 54 of the flanged thrust bearing 53. However, the locking projection 55 is formed with a depression 58 on the side which faces the axial sliding surface 52 of housing 5. This depression 58 has the effect that the locking projection 55, as described in FIG. 8, in the correctly inserted condition of the flanged thrust bearing 53, safely remains at a distance from the arc 51, which is without clearance cut, of housing 5. The locking projection should preferably be opposite to a lubrication groove 10.

Through the arrangement of the locking projection 55, which is provided with depression 58, in the area of lubricating groove 10, lubricating groove 10 and depression 58 can be produced simultaneously in the same operating step.

Although the locking projection 55 of the flanged thrust bearing 53 does not evidence a projection which is inwardly directed towards the radial bearing 22 and engages under the bearing housing 1, a reverse insertion of the flanged thrust bearing 53 is impossible because, as shown by the dot-dash line in FIG. 9, locking projection 55 then interferes with arc 51, which is without clearance cut, of bearing 5 so that the flanged thrust bearing sits obliquely on bearing 5 and makes the insertion in bearing housing 1 impossible. However, as FIG. 9 shows, the configuration of locking projection 55, which is still further simplified in accordance with this invention and thus made considerably less expensive, is intended only for use with a more or less cylindrical transition 51, which is without clearance cut between the cylindrical bearing surface 50 and the axial sliding surface 52.

Figure 10A:
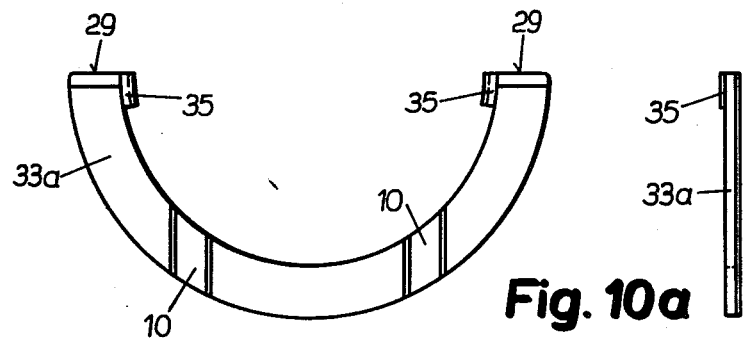
FIGS. 10 (a), (b), (c) and (d) are correlated side and plan views showing additional embodiments for split axial slide bearings in accordance with this invention.
Figure 10B:
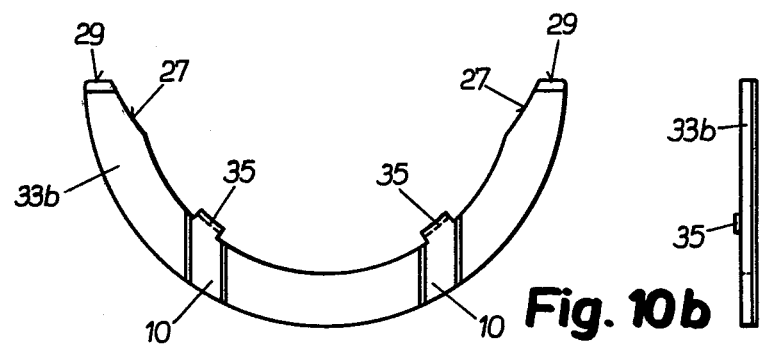

FIG. 10(a) shows a flanged thrust bearing half 33a with two locking projections 35 which are arranged on the inner circumference, near the separation edges 29. Functionally, this configuration is equal to that of flanged thrust bearings 23a and 24a in FIGS. 3 to 6, but the arrangement of the two projections 35 near the separation edges 29 has the possible disadvantage that an effective recess cut is not possible. FIG. 10(b) shows a flanged thrust bearing half 33b, in which two locking projections 35 are provided, which are arranged in the area of lubrication grooves 10, on the inner circumference of the flanged thrust bearing. These projections are spaced from the separation edges 29 by about one third of the inner circumference. In this embodiment, considerably locking function is obtained through projections 35, whereby the recess cut edges 27 may still be formed adjacent the separation edges on the inner circumference of the flanged thrust bearing 33b.

Figure 10C:
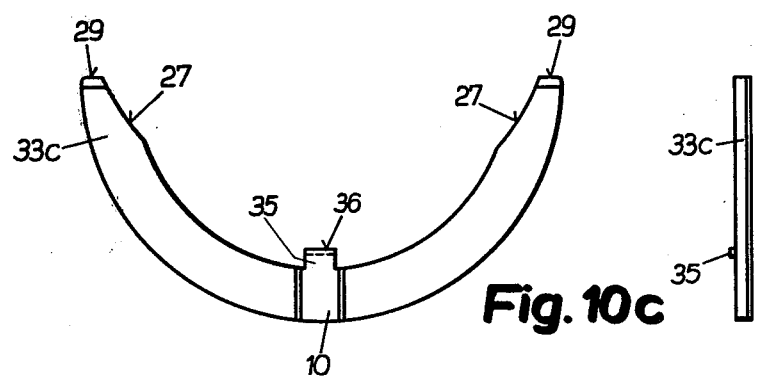
Figure 10D:
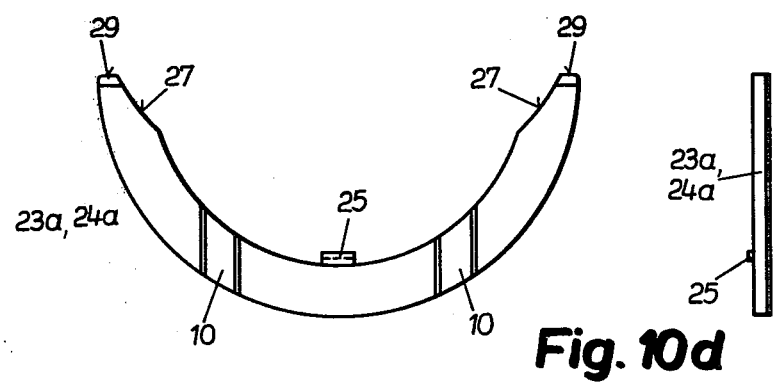

FIG. 10(c) shows a flanged thrust bearing half 33c, which evidences a lubricating groove 10 only in the middle area and has, radially inwardly, in an extension of this lubricating groove region, a locking projection 35, which extends radially inward relatively markedly. The radial length of these locking projections can be readily adapted to any application; however, it must be avoided here that this locking projection 35, with its radially inwardly directed edge 36, comes into contact with shaft 1. FIG. 10(d) shows essentially the configuration of the flanged thrust bearings 23a, respectively 24a, as in the example of FIGS. 3 to 6, but the relief cut edges in this embodiment of the flanged thrust bearing are still more marked. This means that the flanged thrust bearings 23a, respectively 24a, of FIG. 10(d) may have a still closer arrangement in the original sheet metal strip from which they are cut or stamped, so that the material saving which is thus realized is considerable.

While, in the embodiments of FIG. 10, the locking element has a relatively small length in the circumferential direction of the flanged thrust bearing, it is quite possible within the scope of the invention to provide a considerably longer locking element along the inner circumferential edge of the flanged thrust bearing.

Figure 11A:
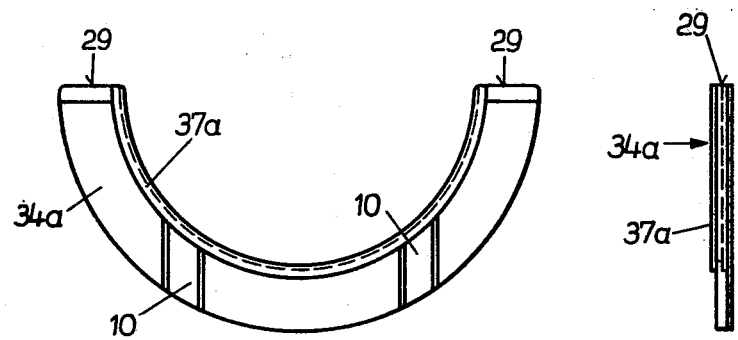
FIGS. 11 (a), (b) and (c) are correlated side and plan views showing additional embodiments for split axial slide bearings in accordance with this invention.
Figure 11B:
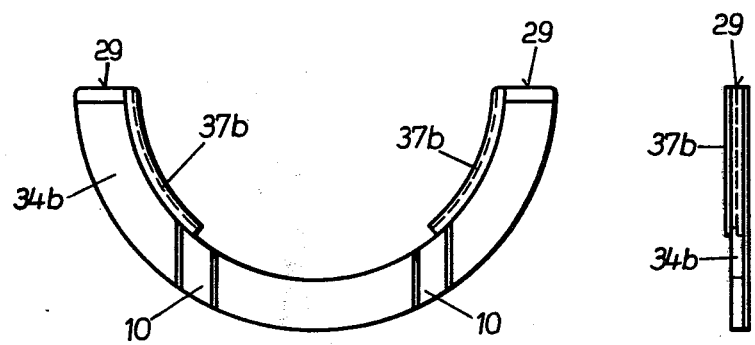
Figure 11C:
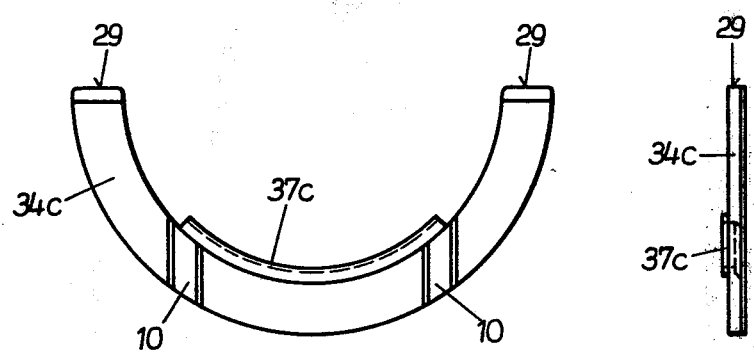

FIG. 11(a) shows a flanged thrust bearing half 34a, which is provided with a substantially continuous rib-shaped locking element 37 over the entire inner circumference. FIG. 11(b) shows a structure wherein the flanged thrust bearing 34b can also have two locking ribs 37b, each of which extends from the separation edge 29 for about one third of the inner circumference. However, in these two configurations, a recess cut at the separation edges is not possible. FIG. 11(c) shows the possibility of extending the locking rib 37c in the middle area to one third to one half of the inner circumference. Although not illustrated, this flanged thrust bearing 34c allows the possibility of a recess cut at the separation edges.

Figure 12:
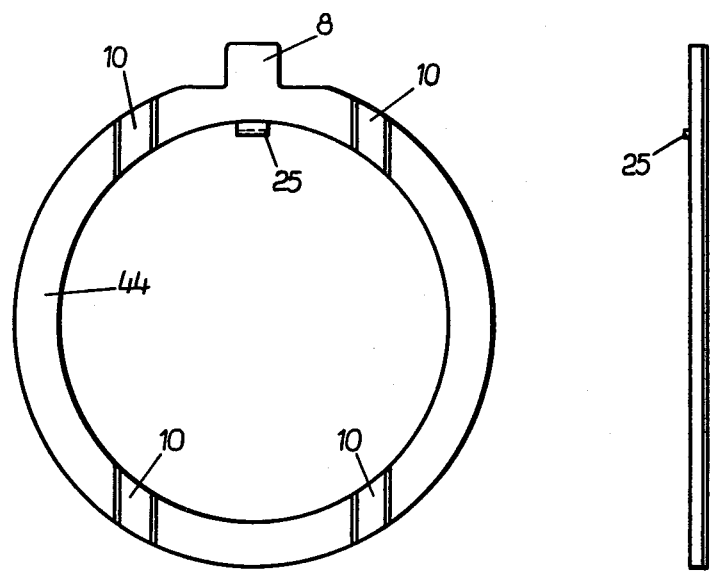
FIG. 12 shows correlated side and plan views of a special configuration for a solid axial slide bearing in accordance with this invention.

In the case of solid axial slide bearings or flanged thrust bearings, it could first be considered to provide a locking function against reversed insertion in such a manner that the rotation prevention strap 8 is arranged asymmetrically, i.e., not radially. However, it is necessary for many applications to apply the rotation prevention strap, as shown in FIG. 12, symmetrically, i.e., extending radially. In this case unless measures are taken, a reversed insertion of the thrust ring 44 would be entirely possible. In FIG. 12 however, an additional locking projection 25 is therefore arranged on the inner circumference of the ring 44. This locking projection 25 is otherwise formed in the same manner as already described for projection 25 in connection with FIGS. 3 to 6. However, any other configuration possibility of the locking element is also possible, as has been described in connection with FIGS. 10 to 13. The location of the locking projection 25 can also be optional within the scope of the foregoing description.

The embodiments shown in FIGS. 10 to 12 can also be carried out in the form of further developed axial slide bearings in accordance with FIGS. 7 to 9. Instead of the locking projections which are shown in FIGS. 10 and 12 (25, respectively 35), locking projections 55 in accordance with FIGS. 8 or 9 could be provided. Correspondingly, the locking ribs 37b and 37c would then have to be formed with a profile like the locking projection 55 in accordance with FIGS. 8 or 9.

Figure 13:
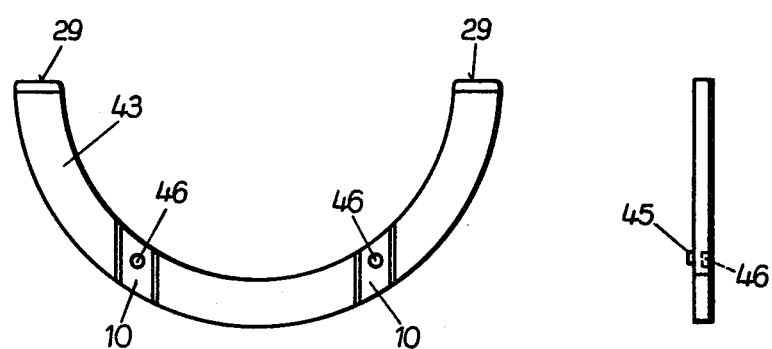
FIG. 13 shows correlated side and plan views of another embodiment for a split axial slide bearing in accordance with this invention.

The thrust discs shown in the embodiments in accordance with FIGS. 10 and 11 and equipped with locking elements on the inner circumference, utilize the above described free space 26 at the radial bearing ends. This free space results in the case of all bearing arrangements without structuural change when a pure radial bearing is used. In newer designs, the possibilities could also readily be provided to make possible the use of other locking elements on the axial slide bearings. For example, the recess 28 (see FIG. 5) of housing 5 could be provided from the start, on its outer circumference, with an additional lubricating groove. In this case, axial slide bearings and flanged thrust bearings could readily be used, of which the locking element is arranged on the outer circumference on the carrying layer side. The configuration of the locking element could then be carried out in a manner similar to FIGS. 10 and 11, but with the difference that the locking element is located on the outer circumference of the axial slide bearing. Another possibility in new designs consists of the fact that an annular groove can be cut into in the middle area of the recess 28 (see FIG. 5) of the housing. For example, those flanged thrust bearings can then be used which are illustrated in FIG. 13. In this example, the flanged thrust bearing half 43 is configured with lug-shaped projections 45 with the areas of their lubricating grooves 10, extending axially inwardly on the carrier layer side. These projections 45 can be formed in such a manner that, on the sliding layer side of the thrust disc 43, within the lubricating groove 10, depressions 46 are punched, which (with the use of a corresponding counter-mold) establish the projecting lugs 45 on the carrier layer side of the thrust disc 43. Although not illustrated, a thrust disc in accordance with FIG. 13 can also be produced with recess cuts at the separation edges.

Figure 14:
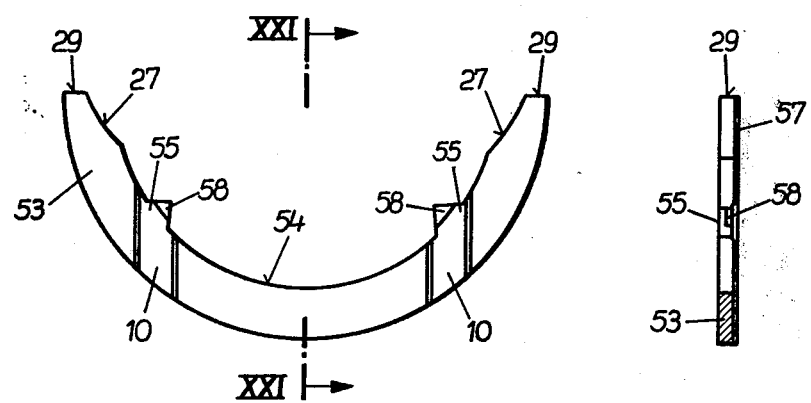
FIG. 14 shows correlated side and plan views of a section of half a bearing ring according to another embodiment.

FIG. 14 shows a thrust disc half 53 with a modified form of locking projection 55 having a modified inner edge 58, arranged as described in FIG. 10(b) but projecting radially inwardly only. This form may be preferred for configurations in accordance with FIG. 9, but it can also be used for other arrangements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a bearing wherein a rotatable shaft is journalled in a radial bearing carried by a support, said shaft having oppositely facing bearing surfaces lying in parallel planes at opposite ends of said radial bearing, there being an annular space between the ends of said radial bearing and the adjacent shaft bearing surface, bearing elements mounted on said support independently of said radial bearing and having axially facing surfaces for thrust bearing engagement with said shaft bearing surfaces, and asymmetrical projecting means on said bearing elements adapted when said bearing elements are correctly mounted on said support to be received in said space and adapted when said bearing elements are incorrectly mounted on said support for interfering engagement with said shaft.

2. The bearing defined in claim 1, wherein said projecting means extend inwardly toward the ends of said radial bearing when said bearing elements are correctly mounted on said support.

3. The bearing defined in claim 1, wherein said projecting means extend radially of said bearing elements.

4. The bearing as defined in claim 1, wherein said projecting means comprises lugs extending inwardly toward the ends of said radial bearing from the inner-circumferential edge of said bearing elements.

5. The bearing as defined in claim 1, together with an additional projection extending radially from said bearing elements into a recess in said support for preventing rotation of said bearing elements.

6. The bearing as defined in claim 5, wherein said additional projection is disposed eccentrically with respect to the axis of said shaft.

* * * * *

UNITED STATES PATENT OFFICE
CERTIFICATE OF CORRECTION

Patent No. 4,133,586      Dated January 9, 1979

Inventor(s) Friedel Maurer

It is certified that error appears in the above-identified patent and that said Letters Patent are hereby corrected as shown below:

On the cover sheet, the illustrative figure should appear as shown below:

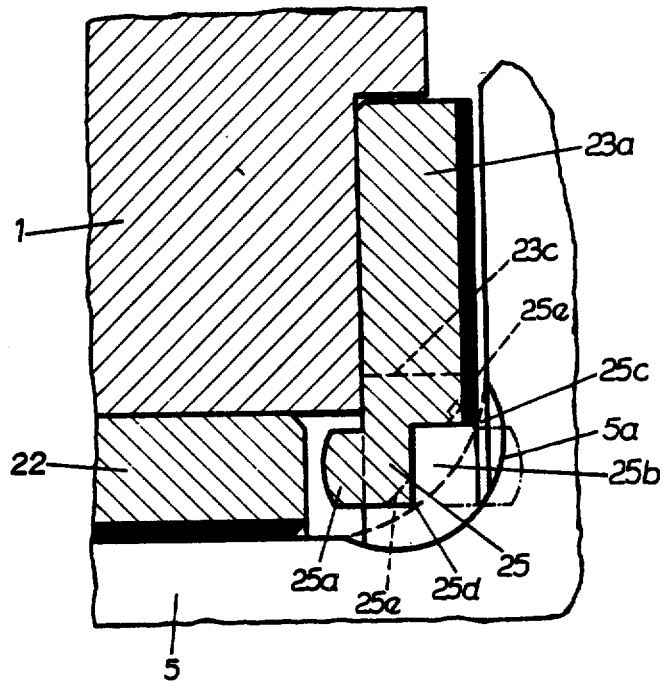

Signed and Sealed this

Seventeenth Day of April 1979

[SEAL]

Attest:

RUTH C. MASON
*Attesting Officer*

DONALD W. BANNER
*Commissioner of Patents and Trademarks*